Oct. 31, 1939.                J. B. FISHER                2,177,700
                         PISTON RING CONSTRUCTION
                           Filed March 22, 1937
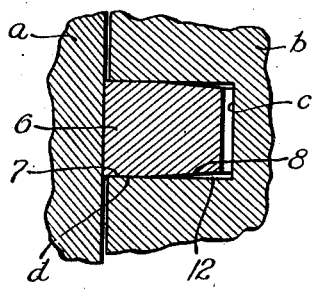
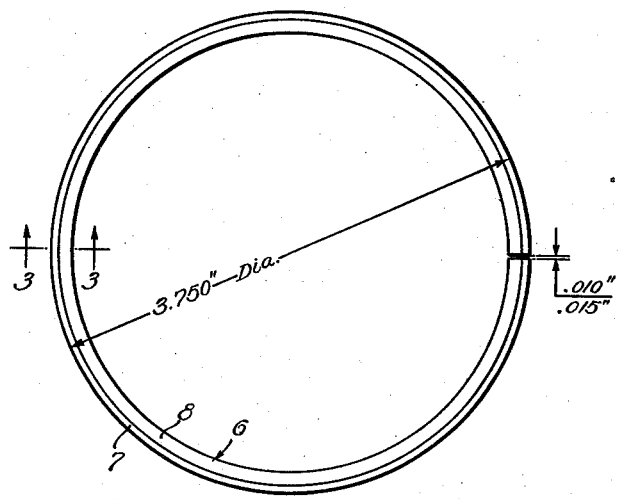
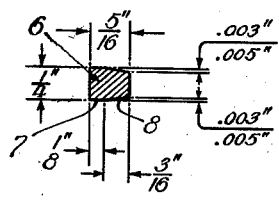
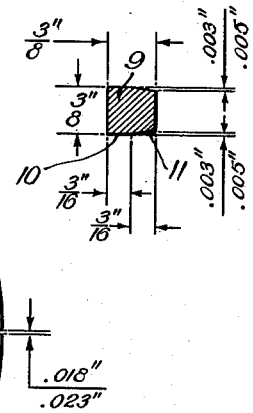
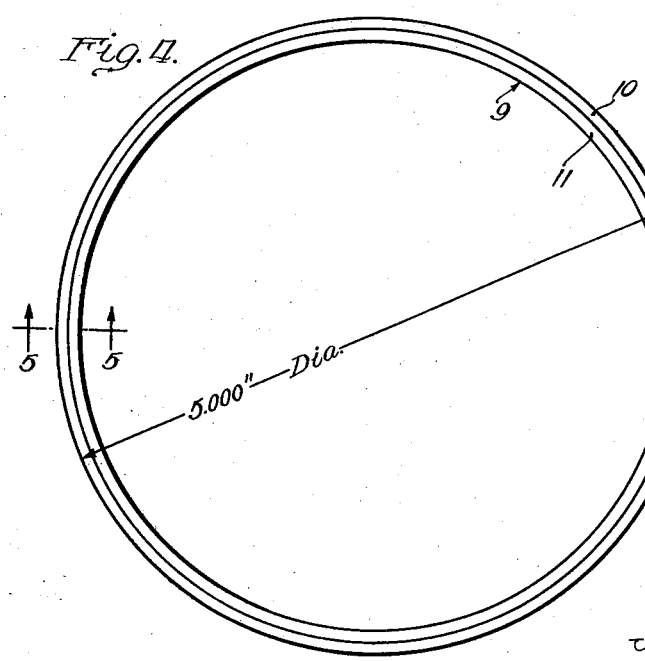
Inventor:
James B. Fisher
By:

Patented Oct. 31, 1939

2,177,700

UNITED STATES PATENT OFFICE 2,177,700

PISTON RING CONSTRUCTION

James B. Fisher, Waukesha, Wis., assignor to Waukesha Motor Company, Waukesha, Wis., a corporation of Wisconsin Application March 22, 1937, Serial No. 132,219

4 Claims. (Cl. 309—44)

This invention relates to internal combustion engines, and has to do with the pistons and piston rings of engines of this type.

The invention is directed to maintaining an effective seal between the piston ring and the piston and the cylinder wall. I have found that by providing a piston ring and a cooperating groove in the piston, so related as to define inwardly diverging clearances between the inner portion of the ring and the upper and lower surfaces of the groove, of certain definite widths, and providing the ring with outer upper and lower relatively narrow surfaces for seating upon the outer portions of the lands of the groove, it is possible to eliminate tilting of the ring in its groove and to maintain the outer face of the ring flat and in sealing contact with the cylinder wall, while also maintaining sealing contact between the lands of the groove and the cooperating surfaces of the ring. In order to attain these results it is necessary to observe certain precise proportions of parts, subject to slight variation within narrow limits. In its preferred form, my invention is embodied in the construction of the piston ring and will be so illustrated and described. Further objects and advantages of my invention will appear from the detailed description.

In the drawing:

Figure 1 is a fragmentary sectional view through a cylinder and piston and piston ring of an internal combustion engine embodying my invention;

Figure 2 is a plan view of a piston ring embodying my invention;

Figure 3 is a sectional view taken substantially on line 3—3 of Figure 2, on a scale of twice the actual size of the ring, shown in actual size in Figure 2;

Figure 4 is a view similar to Figure 2, but showing a ring of greater diameter than that of the latter figure, the ring of Figure 4 being shown in actual size; and Figure 5 is a section taken substantially on line 5—5 of Figure 4, on a scale equal to twice the actual size of the ring.

In Figure 1, I have shown fragmentarily a cylinder $a$ in which operates a piston $b$, this piston being provided with a ring groove $c$ which receives a ring 6 embodying my invention, it being noted that Figure 1 is on a considerably enlarged scale for clearness of illustration.

In Figure 3, the dimensions of the ring, in cross section, are given, it being noted that these dimensions are twice the dimensions of the ring shown in Figure 2. In the latter figure the ring is shown in actual size, as previously stated, and in Figure 3 the dimensions given are twice actual size. With this in mind, it will be noted that the ring of Figure 2 has an outside diameter of 3.75 inches, this being the diameter of the ring when closed or contracted in groove $c$ of piston $b$ within cylinder $a$. Referring to the cross section of the ring and to its actual dimensions, its height is one-eighth of an inch, width five thirty-seconds of an inch, this being the width radially of the ring, and the outer portion of each of the upper and lower surfaces of the ring is flat and normal to the axis thereof, providing a flat surface 7 for seating upon the lands $d$ of the upper and lower walls of groove $c$, the width of each of these flat surfaces, radially of the ring, being one-sixteenth of an inch. Each of the upper and lower surfaces of the ring is chamfered inward at 8, this chamfer extending from the inner edge of surface 7 to the inner side of the ring. In Figure 3, the width of the chamfered surface 8 is given as three-sixteenths of an inch, and the depth of the chamfer is given as from .003 to .005 of an inch. Accordingly, the rate of the chamfer is from .001 to .0016 of an inch, per one-sixteenth of an inch radially of the ring, giving a tolerance of .002 of an inch of variation per inch in chamfer. Since the section of the ring shown in Figure 3 is twice the actual size of the ring of Figure 2, the rate of chamfer of the ring is the same in both cases and, accordingly, the rate of chamfer of the ring of Figure 2 is from .001 to .0016 of an inch per one-sixteenth of an inch radially of the ring, or approximately .001 of an inch per one-sixteenth of an inch radially of the ring.

The ring shown in Figure 4 has an outside diameter of five inches, when contracted and mounted within the piston groove with the piston disposed within the cylinder. Referring to Figure 5, which is drawn to a scale equal to twice the actual size of the ring, as previously noted, ring 9 of Figure 4 has the following dimensions— height $\frac{3}{16}$ths of an inch, radial width $\frac{7}{16}$ths of an inch, radial width of flat surfaces 10 $\frac{3}{32}$nds of an inch, and radial width of chamfered surfaces 11 $\frac{3}{32}$nds of an inch. In Figure 5, the radial width of the chamfered surfaces is given as $\frac{7}{16}$ths of an inch, and the depth of chamfer is given as .003 to .005 of an inch, the rate of chamfer being from .001 to .0016 of an inch, or approximately .001 of an inch per $\frac{1}{16}$th of an inch radially of the ring, as in the ring of Figure 2.

In the case of rings of larger diameters, the cross sectional dimensions of the ring may be varied within narrow limits. For example, a ring having an outside diameter of seven inches may have a height of ¼ of an inch, a width of 3/32nds of an inch, radially of the ring, the radial width of the flat unchamfered portions of the upper and lower surfaces of the ring being 3/32nds of an inch, and the width of the chamfered portions of such surfaces being from 3/32nds to 1/16ths of an inch, radially of the ring. In such a ring, the depth of chamfer may be from .003 to .005 of an inch, as before, the rate of chamfer being from .0005 to .0016 of an inch. Preferably, the rate of chamfer is approximately .001 of an inch per 1/16th of an inch radially of the ring, as above.

In the ring of Figure 2, the ratio of the height of the ring to its radial width is 4:5, and the ratio of the radial width of the unchamfered portion of each of the upper and lower surfaces of the ring to the chamfered portion of such surface is 3:2. In the ring of Figure 4, the ratio of the height of the ring to its radial width is 1:1, and the ratio of the chamfered portion of each of the upper and lower surfaces of the ring to the unchamfered portion of such surface, radially of the ring, is also 1:1. In both rings, the rate of chamfer is approximately .001 of an inch per 1/16th of an inch radially of the ring.

In the ring having an outside diameter of seven inches, above referred to, the ratio of the height of the ring to its radial width is 8:9, and the ratio of the chamfered portion of each of the upper and lower surfaces of the ring to the unchamfered portion of such surface is from 5:3 to 2:1. The rate of chamfer may vary from .0005 to .001 per 1/16th of an inch radially of the ring.

I find that by constructing piston rings in the manner above described, restricting them to the cross sectional dimensions given, within the narrow limits stated, tilting of the ring in the piston groove is eliminated, the outer surface of the ring is maintained flat, and the relatively narrow outer portions of the upper and lower surfaces of the ring seat upon the outer portions of the lands of the groove in the piston in sealing contact therewith. Referring to Figure 1, the flat surfaces 7 of ring 6 provide relatively narrow areas which seat upon and cooperate with the corresponding portions of the lands of groove c in the piston b. The chamfered surfaces 8 of ring 6 define, with the upper and the lower walls of the groove, clearances 12 which diverge inwardly of groove c and increase in height at a rate of approximately .001 of an inch per 1/16th of an inch radially of the ring, that is, radially of the piston and the cylinder. The provision of these clearances, defined in part by surfaces of slight inclination and increasing in height at approximately the rate stated, in conjunction with the relatively narrow surfaces 7 cooperating with the lands of groove c of piston b, with the parts proportioned in the manner above stated, is effective in preventing tilting of the ring in the groove. This assures that the outer face of the ring remains flat and in effective sealing contact with the cylinder wall, and that the ring cooperates with the lands of the groove c in a manner assuring effective sealing contact between these surfaces.

I claim:

1. In combination, an internal combustion engine cylinder, a piston operating in said cylinder provided with a ring groove, and a piston ring of substantially uniform cross-section mounted in said groove having its inner edge spaced an appreciable distance from the bottom of said groove with an unobstructed clearance space between the inner edge of said ring and the bottom of said groove and its outer edge in pressure contact with the cylinder wall, said ring and groove having upper and lower surfaces defining clearances therebetween extending for a portion of said ring diverging inward of said groove and increasing in height at a rate not in excess of from .0005 to .0016 of an inch per 1/16 of an inch radially of said cylinder, the remainder of the width of said upper and lower surfaces of said ring and groove respectively defining flat lands normal to the cylinder axis, the width of said clearances radially of said ring being respectively at least equal to the width of the respective lands of said ring.

2. As a new article of manufacture, a piston ring of substantially uniform cross-section having its upper and lower surfaces respectively chamfered inward for a portion of the width thereof, with the rate of chamfer within from .0005 to .0016 of an inch per 1/16 of an inch radially of the ring, the width of the chamfered portion of the respective surfaces, radially of the ring, being at least equal to the width of the unchamfered portion of the respective surfaces, radially of the ring, the ratio of the height of the ring to its total radial width being from 4:5 to 1:1.

3. As a new article of manufacture, a piston ring of substantially uniform cross-section having its upper and lower surfaces respectively chamfered inward for a portion of the width thereof, with the rate of chamfer within from .001 to .0016 of an inch per 1/16 of an inch radially of the ring, the width of the chamfered portion of the respective surfaces, radially of the ring, being at least equal to the width of the unchamfered portion of said respective surfaces, radially of the ring.

4. As a new article of manufacture, a piston ring of substantially uniform cross-section having its upper and lower surfaces respectively chamfered inward for a portion of the width thereof, with the rate of chamfer approximately .001 of an inch per 1/16 of an inch radially of the ring, the width of the chamfered portion of the respective surfaces, radially of the ring, being not less than the width of the unchamfered portion of said respective surfaces, radially of the ring.

JAMES B. FISHER.